(12) United States Patent
Kanda et al.

(10) Patent No.: US 6,304,528 B1
(45) Date of Patent: Oct. 16, 2001

(54) OPTICAL DISK REPRODUCING APPARATUS

(75) Inventors: Yoshihiro Kanda; Yuuichi Kuze; Kenji Fujiune, all of Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/362,516

(22) Filed: Jul. 28, 1999

(30) Foreign Application Priority Data

Jul. 31, 1998 (JP) ................................................ 10-217263

(51) Int. Cl.$^7$ ...................................................... G11B 7/00
(52) U.S. Cl. .................................... 369/44.28; 369/44.32; 369/53.14
(58) Field of Search ............................. 369/44.28, 44.32, 369/53.13, 47.44, 53.42, 53.43, 53.3, 76, 263, 53.14

(56) References Cited

U.S. PATENT DOCUMENTS

| 5,140,575 | * | 8/1992 | Fushiki | 369/44.28 |
| 6,195,322 | * | 2/2001 | Ohtani et al. | 369/32 |
| 6,222,336 | * | 4/2001 | McKenzie et al. | 369/239 |

FOREIGN PATENT DOCUMENTS 10143991  5/1998  (JP).

* cited by examiner

Primary Examiner—Thang V. Tran
(74) Attorney, Agent, or Firm—Renner, Otto, Boisselle & Sklar, LLP

(57) ABSTRACT

An optical disk reproducing apparatus of the present invention includes a body, a disk motor which rotates a disk in which information recording tracks are formed concentrically or spirally on an information recording surface, a base fixed onto the disk motor and elastically suspended with respect to the body, and an optical head which is suspended with an elastic member from the base and is displaceable in a radial direction of the disk. The apparatus further includes: a track cross detecting portion for generating a track cross pulse, based on a reproduction signal when a light beam emitted from the optical head crosses the information recording tracks; a track cross direction detecting portion for detecting a track cross direction representing a direction in which the light beam emitted from the optical head crosses the information recording tracks; a motor control portion for controlling a velocity of the disk motor and outputting rotational angle information of the disk motor; a counting portion for counting the track cross pulse generated by the track cross detecting portion, based on the track cross direction detected by the track cross direction detecting portion and the rotational angle information output from the motor control portion; and a measurement portion for measuring an amplitude of vibrations of the base, based on a count result of the counting portion.

9 Claims, 9 Drawing Sheets

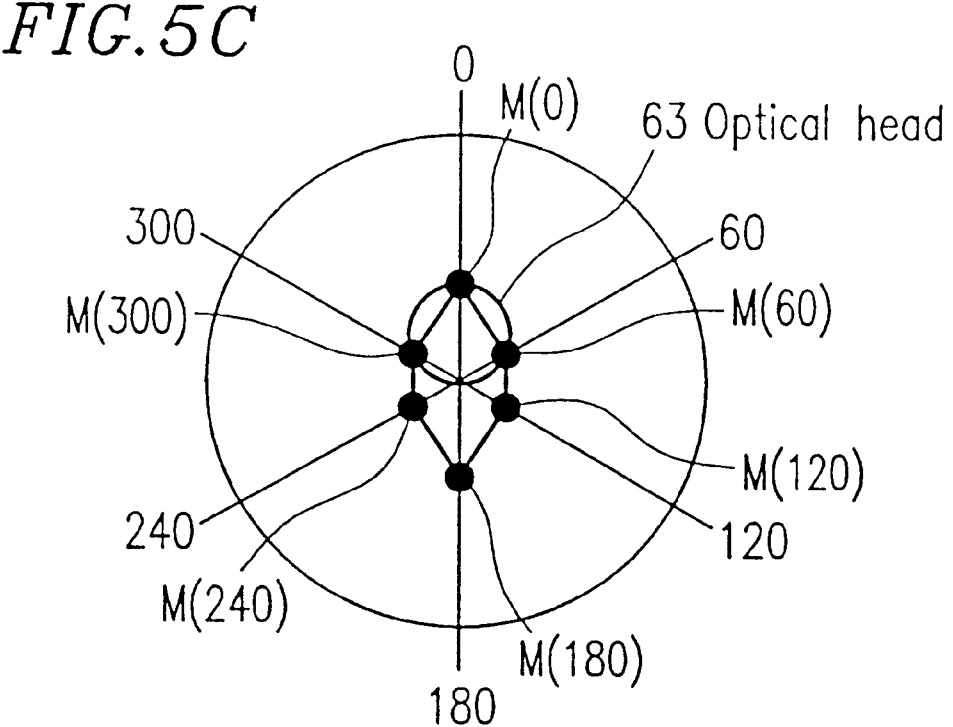

OPTICAL DISK REPRODUCING APPARATUS

BACKGROUND OF THE INVENTION

1. Field of the Invention

The present invention relates to an optical disk reproducing apparatus having a vibration detecting device capable of measuring an amplitude of vibrations caused by mass eccentricity of an optical disk.

2. Description of the Related Art

In recent years, the recording and reproducing speed of an optical disk reproducing apparatus has been remarkably enhanced. In the optical disk reproducing apparatus, the reproducing speed has been enhanced by increasing the rotational speed of the optical disk.

However, when the rotational speed of an optical disk is increased, vibrations caused by mass eccentricity of the optical disk have adverse effects on the control of a servo and the like, which gives disagreeable feelings to a user of an optical disk reproducing apparatus. In order to prevent or reduce adverse effects of the vibrations caused by an optical disk having large mass eccentricity, when such an optical disk is mounted, an optical disk reproducing apparatus limits the rotational speed thereof. The measurement of the amplitude of vibrations is an important technique for assisting in preventing adverse effects of the vibrations caused by an optical disk having mass eccentricity in an optical disk reproducing apparatus.

FIG. 6 is a block diagram of a conventional optical disk reproducing apparatus 600. Reference numeral 1 denotes a base, 2 denotes a disk motor attached to the base, 1, 3 denotes an insulator supporting the base 1, 4 denotes an optical disk attached to the disk motor 2, 21 denotes an acceleration sensor attached to the base 1, and 22 denotes a measurement portion for determining an amount of mass eccentricity, based on an output from the acceleration sensor 21.

When the disk motor 2 is rotated at a predetermined velocity, centrifugal force which is proportional to an amount of mass eccentricity of the optical disk 4 is generated. The base 1 supported by the insulator 3 vibrates at an amplitude determined by the amount of mass eccentricity of the optical disk 4, the entire mass of the base 1 and components mounted thereon, and the spring constant of the insulator 3.

The vibrations of the base 1 are converted into an electrical signal by the acceleration sensor 21. The measurement portion 22 measures the amplitude of the vibrations of the base 1 based on the electrical signal converted by the acceleration sensor 21.

However, in the above-mentioned optical disk reproducing apparatus 600, the acceleration sensor 21 and a signal amplifier (not shown) for amplifying a signal from the acceleration sensor 21 are provided, which increases cost.

Furthermore, space is required for mounting the acceleration sensor 21 and the signal amplifier.

SUMMARY OF THE INVENTION

An optical disk reproducing apparatus of the present invention includes a body, a disk motor which rotates a disk in which information recording tracks are formed concentrically or spirally on an information recording surface, a base fixed onto the disk motor and elastically suspended with respect to the body, and an optical head which is suspended with an elastic member from the base and is displaceable in a radial direction of the disk. The apparatus further includes: a track cross detecting portion for generating a track cross pulse, based on a reproduction signal when a light beam emitted from the optical head crosses the information recording tracks; a track cross direction detecting portion for detecting a track cross direction representing a direction in which the light beam emitted from the optical head crosses the information recording tracks; a motor control portion for controlling a velocity of the disk motor and outputting rotational angle information of the disk motor; a counting portion for counting the track cross pulse generated by the track cross detecting portion, based on the track cross direction detected by the track cross direction detecting portion and the rotational angle information output from the motor control portion; and a measurement portion for measuring an amplitude of vibrations of the base, based on a count result of the counting portion.

In one embodiment of the present invention, the motor control portion rotates the disk motor at a first velocity and a second velocity which is higher than the first velocity, the track cross pulse includes a first track cross pulse generated at the first velocity and a second track cross pulse generated at the second velocity, the count result includes a first count result at the first velocity and a second count result at the second velocity, the counting portion counts the first track cross pulse at the first velocity and the second track cross pulse at the second velocity, and the measurement portion computes a difference between the first count result at the first velocity and the second count result at the second velocity.

In another embodiment of the present invention, the rotational angle information includes an absolute position of a rotational angle of the disk, the absolute position includes a rotational angle $\theta[i]$ (i is a natural number, $0° \leq \theta[i] \leq 360°$) obtained by dividing the disk by a plurality of angular segments, and the counting portion counts the track cross pulse from a rotational angle $\theta[i-1]$ to a rotational angle $\theta[i]$ (i is a natural number, $0° \leq \theta[i-1] < \theta[i] \leq 360°$) to obtain a count result $N(\theta[1])$.

In another embodiment of the present invention, the counting portion discards the count result $N(\theta[i])$ in a case where a difference in an absolute value between the count result $N(\theta[i])$ and a count result $N(\theta[i]+180)$ between which a rotational angle of the disk is apart by 180°.

In another embodiment of the present invention, the motor control portion rotates the disk motor at a first velocity and a second velocity which is higher than the first velocity, the track cross pulse includes a first track cross pulse generated at the first velocity and a second track cross pulse generated at the second velocity, the count result $N(\theta[i])$ includes a first count result $N1(\theta[i])$ at the first velocity and a second count result $N2(\theta[i])$ at the second velocity, the counting portion counts the first track cross pulse at the first velocity and the second track cross pulse at the second velocity, and the measurement portion computes a difference $M(0[i])$ between the first count result $N1(\theta[i])$ of the counting portion at the first velocity and the second count result $N2(\theta[i])$ of the counting portion at the second velocity, and obtains a maximum value of the difference $M(\theta[i])$ to measure an amplitude of vibrations of the base.

In another embodiment of the present invention, the rotational angle information includes an absolute position of a rotational angle of the disk, the absolute position includes a rotational angle $\theta[i]$ (i is a natural number, $0° \leq \theta[i] \leq 360°$) obtained by dividing the disk by angular segments at 60°, and the counting portion counts the track cross pulse for each rotational angle 60° to obtain a count result $N(\theta[i])$.

In another embodiment of the present invention, the motor control portion rotates the disk motor at a first velocity and a second velocity which is higher than the first velocity, the count result includes a first count result at the first velocity and a second count result at the second velocity, the measurement portion represents a subtraction result between the first count result at the first velocity and the second count result at the second velocity as a vector having a corresponding disk rotational angle as a phase angle and the subtraction result with a sign as an absolute value, and the measurement portion computes six differential vectors between the vectors adjacent to each other, and computes an average of an absolute value of the six differential vectors to measure an amplitude of vibrations of the base.

In another embodiment of the present invention, the counting portion averages the count result of a plurality of rotations of the disk.

In another embodiment of the present invention, the motor control portion rotates the disk motor at a third velocity which is higher than the second velocity, the track cross pulse further includes a third track cross pulse generated at the third velocity, the count result further includes a third count result at the third velocity, the counting portion further counts the third track cross pulse at the third velocity, and the measurement portion further computes a difference between the third count result at the third velocity and the first count result at the first velocity.

According to one aspect of the present invention, an optical disk reproducing apparatus uses an optical head included therein for detecting vibrations. The optical disk reproducing apparatus counts the number of information recording tracks formed on an optical disk, which a light beam emitted from the optical head crosses, and measures a change in the relative position between the optical disk and the optical head which are displaced together with a base with a precision of about 1 $\mu$m. Consequently, an optical reproducing apparatus can be provided, which has a vibration detecting device capable of measuring an amplitude of vibrations without using an acceleration sensor and a signal amplifier at a low cost and with minimal use of space.

According to another aspect of the present invention, utilizing that the vibrations of the base caused by the eccentricity of the optical disk and the mass eccentricity thereof are in a sine wave, even in the case where the direction of eccentricity of the optical disk is different from that of the mass eccentricity thereof, vibrations can be measured with a higher precision.

The optical disk is rotated at a first velocity selected in the same way as described above. The optical disk is divided into a plurality of angular segments, and a track count with a sign is performed on a divided unit basis. Thus, sine wave data of the eccentricity of the optical disk is obtained. Then, the optical disk is rotated at a second velocity selected in the same way as described above. Sine wave data in which the vibrations of the base are combined with the eccentricity of the information recording tracks is obtained. The difference between these sine wave data is computed, whereby sine wave data of only the vibrations is obtained. Then, the maximum value thereof is selected to measure an amplitude of vibrations. Furthermore, sine waves become identical to each other in an absolute value and different from each other in a sign at positions where phase angles are different by 180°. Utilizing this fact, when track count data is obtained, in the case where an absolute value of data whose disk rotational angle is different by 180° from the track count data is different from an absolute value of the track count data by a predetermined value or more, measurement is performed again considering that a noise is contained in the track count data, whereby a measurement precision can be further enhanced.

As described above, an amplitude of vibrations can be measured while the effects of the directions of eccentricity and mass eccentricity of the optical disk are eliminated.

According to still another aspect of the present invention, a track count is performed by dividing the optical disk by six angular segments. A subtraction result between a count result of the counting portion at the first velocity and a count result of the counting portion at the second velocity per angular segment at 60° is represented by a vector having a corresponding disk rotational angle as a phase angle and a subtraction result with a sign as an absolute value. Six differential vectors between vectors whose phase angles are adjacent to each other are computed, and an average of absolute values of these six vectors is computed. Therefore, measurement of an amplitude of vibrations with a higher precision can be performed.

According to still another aspect of the present invention, the counting portion averages count data for a plurality of rotations of an optical disk. Therefore, an amplitude of vibrations can be measured with an enhanced precision.

According to still another aspect of the present invention, the measurement portion measures an amplitude of vibrations based on count results of the counting portion at the first and second velocities. In addition, the measurement portion measures an amplitude of vibrations with a higher precision based on count results at the third velocity higher than the second velocity, if required, at the fourth, the fifth, ... the n-th velocity. An amplitude of vibrations increases in proportion to the square of a velocity of the optical disk, so that the measurement precision of an amplitude of vibrations can be increased. Utilizing this, the measuring portion completes the measurement of an amplitude of vibrations at a lower velocity in the case of an optical disk having large mass eccentricity, and performs measurement of an amplitude of vibrations at a higher velocity in the case of an optical disk having small mass eccentricity. Therefore, vibrations can be measured while an amplitude of vibrations of the base is reduced to a predetermined value or less.

Thus, the invention described herein makes possible the advantage of providing an optical disk reproducing apparatus having a vibration detecting device capable of measuring an amplitude of vibrations without using an acceleration sensor and a signal amplifier at a low cost with minimal use of space.

These and other advantages of the present invention will become apparent to those skilled in the art upon reading and understanding the following detailed description with reference to the accompanying figures.

BRIEF DESCRIPTION OF THE DRAWINGS

FIG. 5C is a distribution diagram of measurement data of a subtraction result M(θ[i]) of Embodiment 3 according to the present invention.

DESCRIPTION OF THE PREFERRED EMBODIMENTS

Hereinafter, the present invention will be described by way of illustrative embodiments with reference to the drawings.

Herein, eccentricity refers to a shift between the rotational center of an optical disk mounted on an optical disk reproducing apparatus and the center of an information recording track. Mass eccentricity refers to a shift between the rotational center of an optical disk mounted on an optical disk reproducing apparatus and the center of gravity of the optical disk.

Embodiment 1

Figure 1:
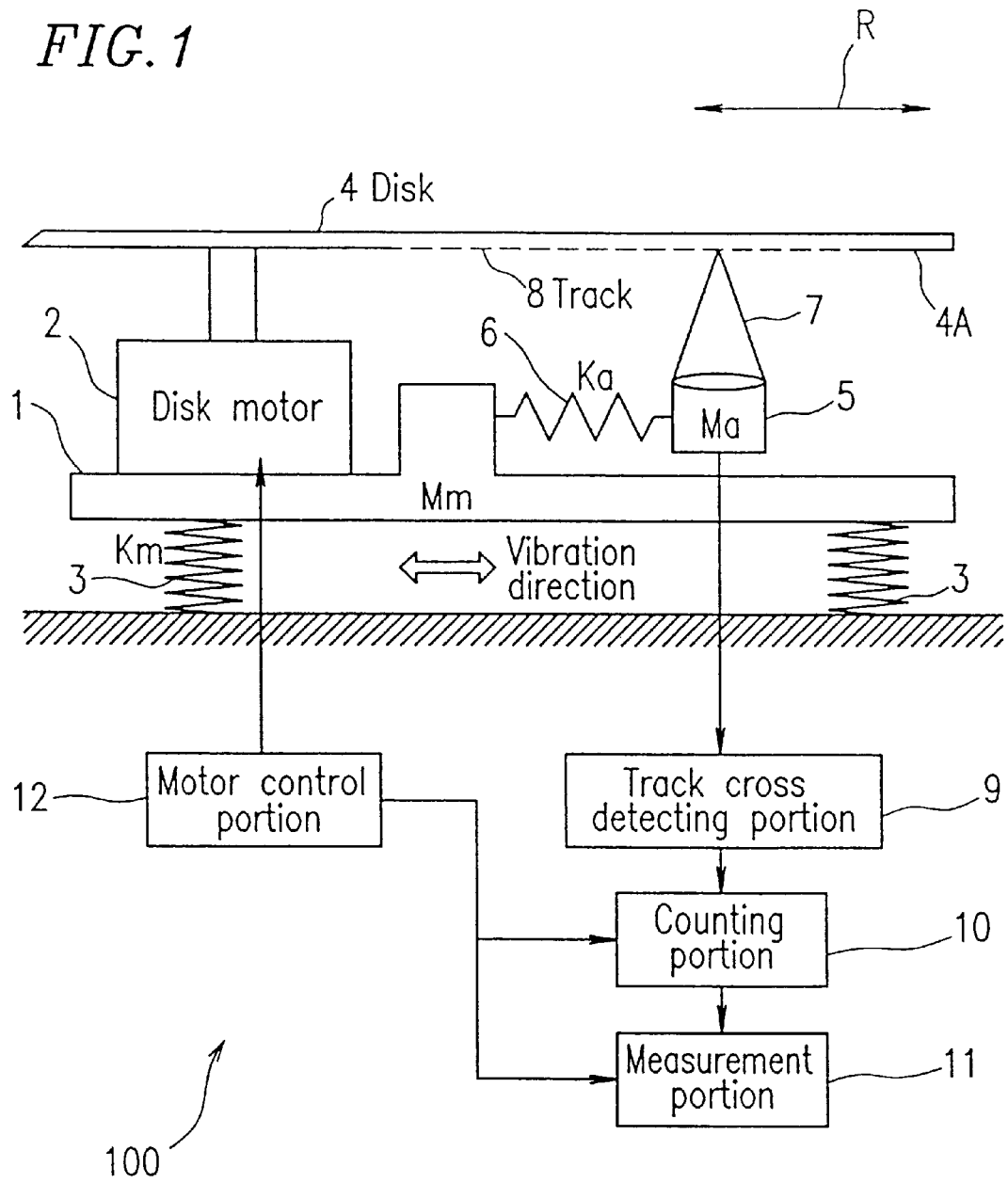
FIG. 1 is a block diagram showing a vibration detecting device of Embodiment 1 according to the present invention.

FIG. 1 is a block diagram of an optical disk reproducing apparatus 100 of Embodiment 1 according to the present invention. In FIG. 1, reference numeral 1 denotes a base, 2 denotes a disk motor fixed onto the base 1, 3 denotes an insulator supporting the base 1, 4 denotes an optical disk mounted on the disk motor 2, 5 denotes an optical head, 6 denotes an elastic member suspending the optical head 5 from the base 1, 7 denotes a light beam radiated from the optical head 5 to the optical disk 4, 8 denotes information recording tracks formed concentrically or spirally at a constant pitch on an information recording surface 4A of the optical disk 4, 9 denotes a track cross detecting portion for generating a track cross pulse and a transverse direction signal from a signal reproduced when the light beam 7 crosses the information recording tracks 8, 10 denotes a counting portion for counting a track cross pulse, 11 denotes a measurement portion for determining an amount of mass eccentricity from a count result of the counting portion 10, and 12 denotes a motor control portion for controlling the velocity of the disk motor 2 and outputting rotational angle information to the measurement portion 11.

The optical head 5 is kept at a constant distance from the optical disk 4 so that a focal point of the light beam 7 is positioned on the information recording surface 4A of the optical disk 4. The relative position of the optical head 5 with respect to the optical disk 4 in a radial direction (represented by an arrow R) of the optical disk 4 has vibration characteristics represented by an intrinsic frequency foA determined by the spring constant of the elastic member 6 made of metal, resin, or rubber and the mass of the optical head 5.

The base 1 is supported by the insulator 3 made of metal, resin, or rubber. When the centrifugal force generated by the rotation of the optical disk 4 is transmitted to the base 1 through the disk motor 2, the base 1 vibrates based on the characteristics represented by an intrinsic frequency foM determined by the entire mass of the base 1 and components mounted thereon including the optical head 5, the disk motor 2, and the optical disk 4, and the spring constant of the insulator 3.

The motor control portion 12 rotates the disk motor 2 at a first velocity which generates a frequency sufficiently lower than the intrinsic frequency foA. The optical disk 4 mounted on the disk motor 2 rotates at the first velocity.

At the first velocity, the optical head 5 vibrates together with the base 1. The relative position of the optical head 5 with respect to the optical disk 4 hardly changes. Therefore, at the first velocity, the light beam 7 crosses the information recording tracks 8, corresponding to the amount of eccentricity of the optical disk 4. More specifically, as the amount of eccentricity of the optical disk 4 becomes larger, the light beam 7 crosses a larger number of information recording tracks 8. The light beam 7 generates a track cross which represents the number of the information recording tracks 8 crossed by the light beam 7.

The track cross detecting portion 9 detects the track cross which represents the number of the information recording tracks 8 crossed by the light beam 7, based on a reproduction signal of the optical head 5. The track cross detecting portion 9 generates a track cross pulse corresponding to the detected track cross. The track cross detecting portion 9 outputs the generated track cross pulse to the counting portion 10.

The counting portion 10 counts a track cross pulse during one rotation of the optical disk 4, based on the rotational angle information from the motor control portion 12. The measurement portion 11 memorizes a count result N1 of the track cross pulse during one rotation of the optical disk 4 counted by the counting portion 10.

Next, the motor control portion 12 rotates the disk motor 2 at a second velocity which generates a frequency higher than the intrinsic frequency foA and lower the intrinsic frequency foM. Due to the mass eccentricity of the optical disk 4, a centrifugal force is generated in the optical disk 4. The base 1 vibrates at an amplitude determined by the amount of mass eccentricity of the optical disk 4, the entire mass of the base 1 and components mounted thereon, and the spring constant of the insulator 3.

When the disk motor 2 rotates at the second velocity, only the base 1, the disk motor 2, and the optical disk 4 vibrate together, and the optical head 5 stands still. Therefore, the relative displacement between the optical disk 4 and the optical head 5 becomes equal to that between the base 1 and the optical head 5. As a result, the light beam 7 generates a track cross which represents the number of tracks corresponding to the amount of eccentricity of the optical disk 4 with the amplitude of vibrations of the base 1 added thereto.

The track cross detecting portion 9 detects the track cross which represents the number of tracks corresponding to the amount of eccentricity of the optical disk 4 with the amplitude of vibrations of the base 1 added thereto, based on a reproduction signal of the optical head 5. The track cross detecting portion 9 generates a track cross pulse of the number of tracks corresponding to the amount of eccentricity of the optical disk 4 with the amplitude of vibrations of the base 1 added thereto. The track cross detecting portion 9 outputs the generated track cross pulse to the counting portion 10.

The counting portion 10 counts a track cross pulse during one rotation of the optical disk 4, based on the rotational angle information from the motor control portion 12. The measurement portion 11 subtracts the count result N1 from a count result N2 counted by the counting portion 10, thereby obtaining an amplitude of vibrations of the base 1.

Embodiment 2

Figure 2A:
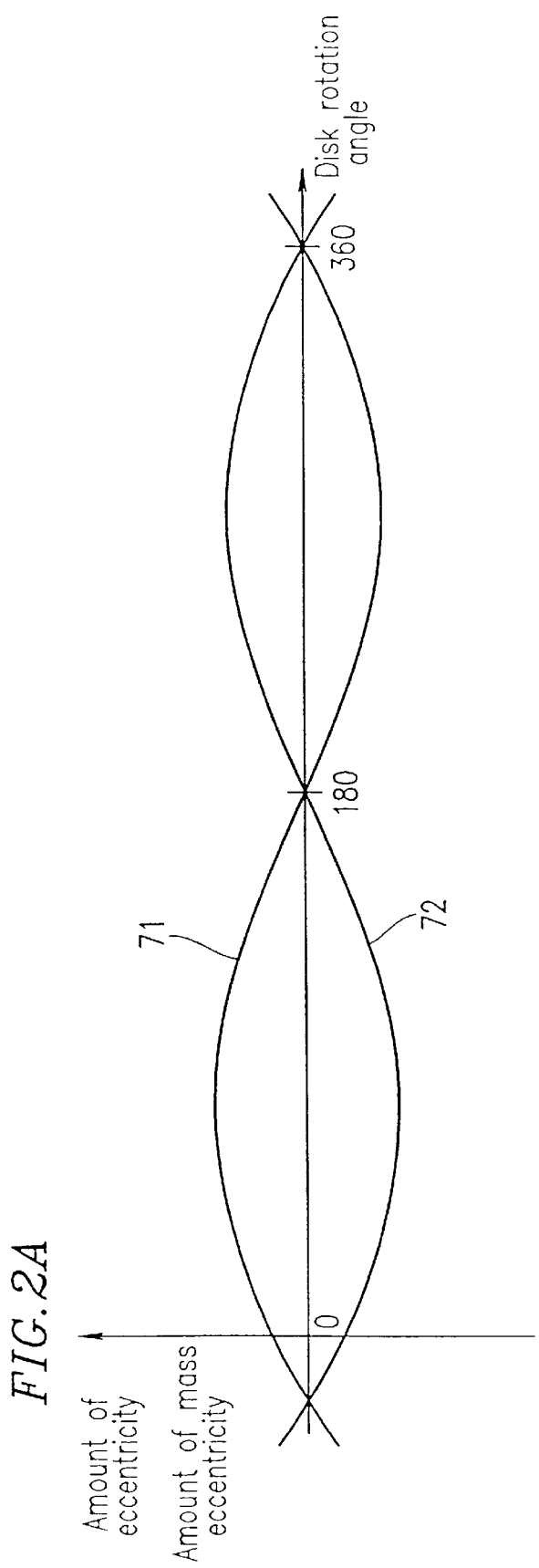
FIG. 2A is a diagram showing a signal waveform in the case where the direction of eccentricity of an optical disk of Embodiment 1 according to the present invention is different from the direction of mass eccentricity thereof.
Figure 2B:
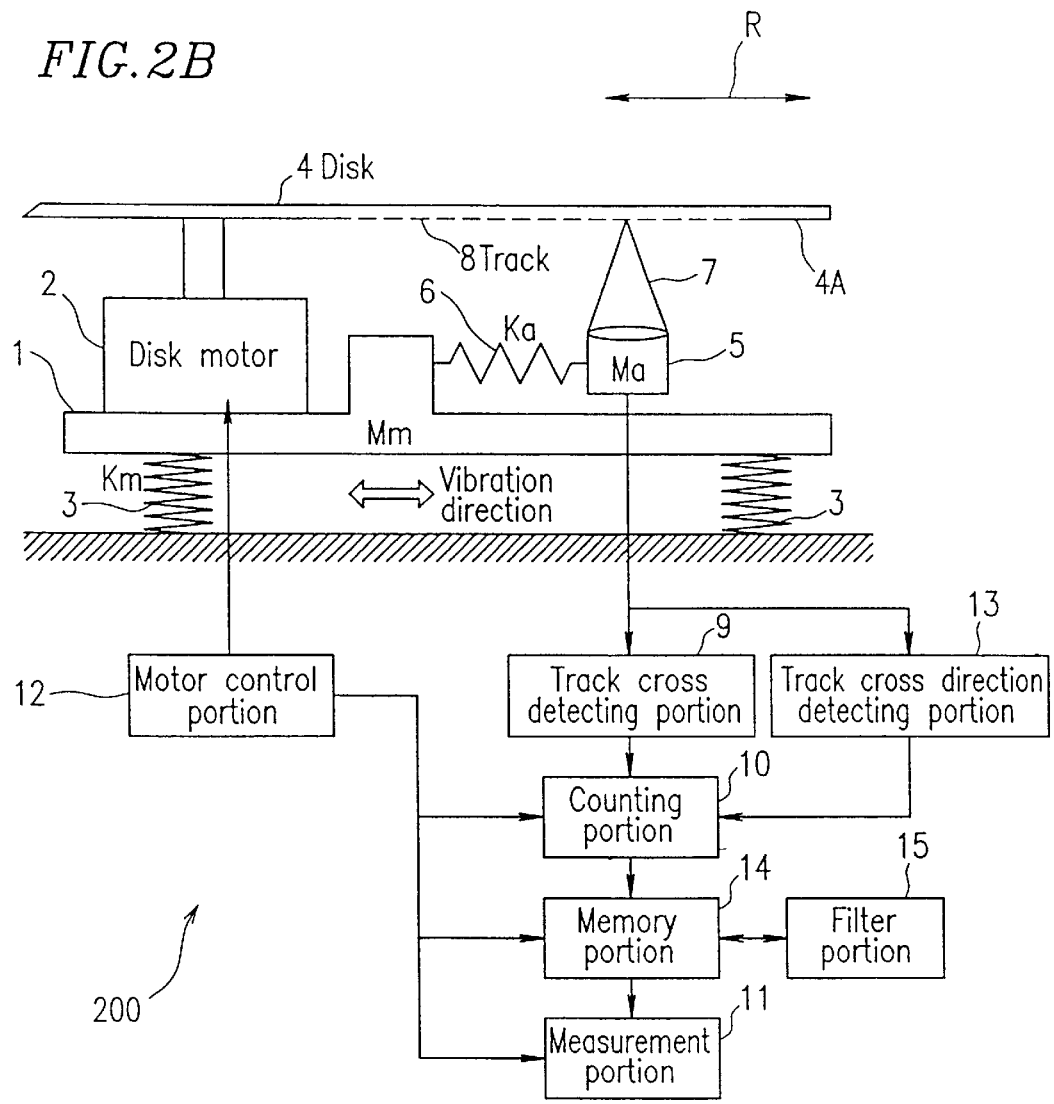
FIG. 2B is a block diagram showing a vibration detecting device of Embodiment 2 according to the present invention.

FIG. 2B is a block diagram of an optical disk reproducing apparatus 200 of Embodiment 2 according to the present invention. The same components as those in the optical disk reproducing apparatus 100 of Embodiment 1 in FIG. 1 are denoted with the same reference numerals as those therein. The detailed description thereof will be omitted.

The optical disk reproducing apparatus 200 of Embodiment 2 is different from the optical disk reproducing apparatus 100 of Embodiment 1, in that the optical disk reproducing apparatus 200 includes a track cross direction detecting portion 13, a memory portion 14, and a filter portion 15.

In the optical disk reproducing apparatus 100 of Embodiment 1, in the case where the direction of eccentricity of the optical disk 4 is different from that of mass eccentricity thereof, a track cross which represents the number of tracks corresponding to the amount of eccentricity of the optical disk 4 with the amplitude of vibrations of the base 1 added thereto is not generated at the second velocity, so that the amplitude of vibrations of the base 1 cannot be obtained.

For example, when the direction of eccentricity of the optical disk 4 is opposite to that of mass eccentricity thereof, as shown in FIG. 2A, the waveform 71 of the amount of eccentricity with respect to the rotational angle of an optical disk has a reverse-phase relationship with the waveform 72 of the amount of mass eccentricity. As a result, a track cross which represents the number of tracks corresponding to the amount of eccentricity of the optical disk 4 with the amplitude of vibrations of the base 1 added thereto in the same phase is not generated at the second velocity, so that the amplitude of vibrations of the base 1 cannot be obtained.

In the optical disk reproducing apparatus 200 of Embodiment 2, the track cross direction detecting portion 13 is provided. Therefore, the number of tracks crossed by a light beam can be counted with a plus sign or a minus sign, depending upon the crossing direction of the light beam. In the optical disk reproducing apparatus 200 of Embodiment 2, an optical disk is divided by angular segments, and a track count with a plus sign or a minus sign is performed on a divided unit basis, whereby first sine wave data representing the eccentricity of the optical disk 4 is obtained. Next, the optical disk 4 is rotated at the second velocity, and second sine wave data in which the vibrations of the base 1 are combined with the eccentricity of the optical disk 4 is obtained. The difference between the first sine wave data and the second sine wave data is calculated to obtain sine wave data of only the vibrations of the base 1, and the maximum value thereof is selected. Thus, the amplitude of vibrations is measured.

In FIG. 2B, reference numeral 1 denotes a base, 2 denotes a disk motor fixed onto the base 1, 3 denotes an insulator supporting the base 1, 4 denotes an optical disk mounted on the disk motor 2, 5 denotes an optical head, 6 denotes an elastic member suspending the optical head 5 from the base 1, 7 denotes a light beam radiated from the optical head 5 to the optical disk 4, 8 denotes information recording tracks formed concentrically or spirally at a constant pitch on an information recording surface 4A of the optical disk 4, 9 denotes a track cross detecting portion for generating a track cross pulse from a signal reproduced when the light beam 7 crosses the information recording tracks 8, 13 denotes a track cross direction detecting portion for detecting a track cross direction from a signal reproduced when the light beam 7 crosses the information recording tracks 8, 10 denotes a counting portion for counting up or counting down the above-mentioned track cross pulse in accordance with the output from the track cross direction detecting portion 13, 14 denotes a memory portion for memorizing a count result, 15 denotes a filter portion for removing a count result with a large error from data of the memory portion 14, 11 denotes a measurement portion for determining an amount of mass eccentricity from a count result, and 12 denotes a motor control portion for controlling the velocity of the disk motor 2 and outputting rotational angle information to the counting portion 10, the memory portion 14, and the measurement portion 11.

In the same way as in Embodiment 1, the optical head 5 is kept at a constant distance from the optical disk 4 so that a focal point of the light beam 7 is positioned on the information recording surface 4A of the optical disk 4. The relative position of the optical head 5 with respect to the optical disk 4 in a radial direction (represented by an arrow R) of the optical disk 4 has vibration characteristics represented by an intrinsic frequency foA determined by the spring constant of the elastic member 6 made of metal, resin, or rubber and the mass of the optical head 5.

The base 1 is supported by the insulator 3 made of metal, resin, or rubber. When the centrifugal force generated by the rotation of the optical disk 4 is transmitted to the base 1 through the disk motor 2, the base 1 vibrates based on the characteristics represented by an intrinsic frequency foM determined by the entire mass of the base 1 and components mounted thereon, and the spring constant of the insulator 3.

The motor control portion 12 rotates the disk motor 2 at a first velocity which generates a frequency sufficiently lower than the intrinsic frequency foA.

At the first velocity, the optical head 5 vibrates together with the base 1. The relative position of the optical head 5 with respect to the optical disk 4 hardly changes. Therefore, at the first velocity, the light beam 7 crosses the information recording tracks 8, corresponding to the amount of eccentricity of the optical disk 4. The light beam 7 generates a track cross corresponding to the number of the information recording tracks 8 crossed by the light beam 7.

The track cross detecting portion 9 detects the track cross corresponding to the number of the information recording tracks 8 crossed by the light beam 7, based on a reproduction signal of the optical head 5. The track cross detecting portion 9 generates a track cross pulse corresponding to the detected track cross. The track cross detecting portion 9 outputs the generated track cross pulse to the counting portion 10. Up to this point, the same steps as those of Embodiment 1 are performed.

The track cross direction detecting portion 13 detects a track cross direction from a reproduction signal of the optical head 5. Based on the rotational angle information from the motor control portion 12, the counting portion 10 counts a track cross pulse from an angle θ[i−1] to an angle θ[i] (i=1 . . . k) every time the rotational angle of the optical disk 4 matches with an angle θ1, θ2 . . . θi . . . θk (=360) obtained by angularly dividing the optical disk 4 by k. The memory portion 14 memorizes the track cross direction detected by the track cross direction detecting portion 13 and a count result N1(θ[i]) counted by the counting portion 10.

The filter portion 15 determines whether or not the difference in an absolute value between the count result N1 (θ[i]) and the count result N1(θ[i]+180) (i=1, 2 . . . k/2) memorized in the memory portion 14 is a predetermined value or less. If there is at least one combination of the count result N1(θ[i]) which exceeds the predetermined value, based on the rotational angle information from the motor control portion 12, the counting portion 10 counts a track cross pulse from an angle θ[i−1] to θ[i] (i=1 . . . k) every time the rotational angle of the optical disk 4 matches with an angle θ1, θ2 . . . θi . . . θk (=360) obtained by dividing the optical disk 4 by k.

Next, in the same way as in Embodiment 1, the motor control portion 12 rotates the disk motor 2 at the second velocity which generates a frequency higher than the intrinsic frequency foA and lower than the intrinsic frequency foM. Due to the mass eccentricity of the optical disk 4, a centrifugal force is generated in the optical disk 4. The base 1 vibrates at an amplitude determined by the amount of mass concentricity of the optical disk 4, the entire mass of the base 1 and components mounted thereon, and the spring constant of the insulator 3.

The optical head 5 stands still. Therefore, the relative displacement between the optical disk 4 and the optical head 5 becomes equal to that of the base 1 and the optical head 5. As a result, the light beam 7 generates a track cross which represents the number of tracks corresponding to the amount of eccentricity of the optical disk 4 with the amplitude of vibrations of the base 1 added thereto.

The track cross detecting portion 9 detects the track cross which represents the number of tracks corresponding to the amount of eccentricity of the optical disk 4 with the amplitude of vibrations of the base 1 added thereto, based on a reproduction signal of the optical head 5. The track cross detecting portion 9 generates a track cross pulse of the number of tracks corresponding to the amount of eccentricity of the optical disk 4 with the amplitude of vibrations of the base 1 added thereto. The track cross detecting portion 9 outputs the generated track cross pulse to the counting portion 10.

The track cross direction detecting portion 13 detects a track cross direction from a reproduction signal from the optical head 5. The counting portion 10 performs the same counting as in the case of the first velocity described above, and the memory portion 14 memorizes a count result N2(θ[i]).

The filter portion 15 determines whether or not the difference in an absolute value between the count result N2(θ[i]) and the count result N2(θ[i])+180) (i =1, 2 . . . k/2) memorized in the memory portion 14 is a predetermined value or less. If there is at least one combination of the count result N2(θ[i]) which exceeds the predetermined value, based on the rotational angle information from the motor control portion 12, the counting portion 10 discards the count result N2 and counts a track cross pulse from an angle θ[i−1] to θ[i] (i=1 . . . k) every time the rotational angle of the optical disk 4 matches with an angle θ1, θ2 . . . θi . . . θk (=360) obtained by dividing the optical disk 4 by k.

The measurement portion 11 subtracts the count result N1(θ[i]) (i=1, 2 . . . k) from the count result N2 (θ[i]) for each θ[i] (i=1, 2 . . . k) to obtain a subtraction result M(θ[i]). The measurement portion 11 is capable of obtaining the amplitude of vibrations of the base 1 from the maximum value of the subtraction result M(θ[i]) (i=1, 2 . . . k).

Embodiment 3

Figure 3:
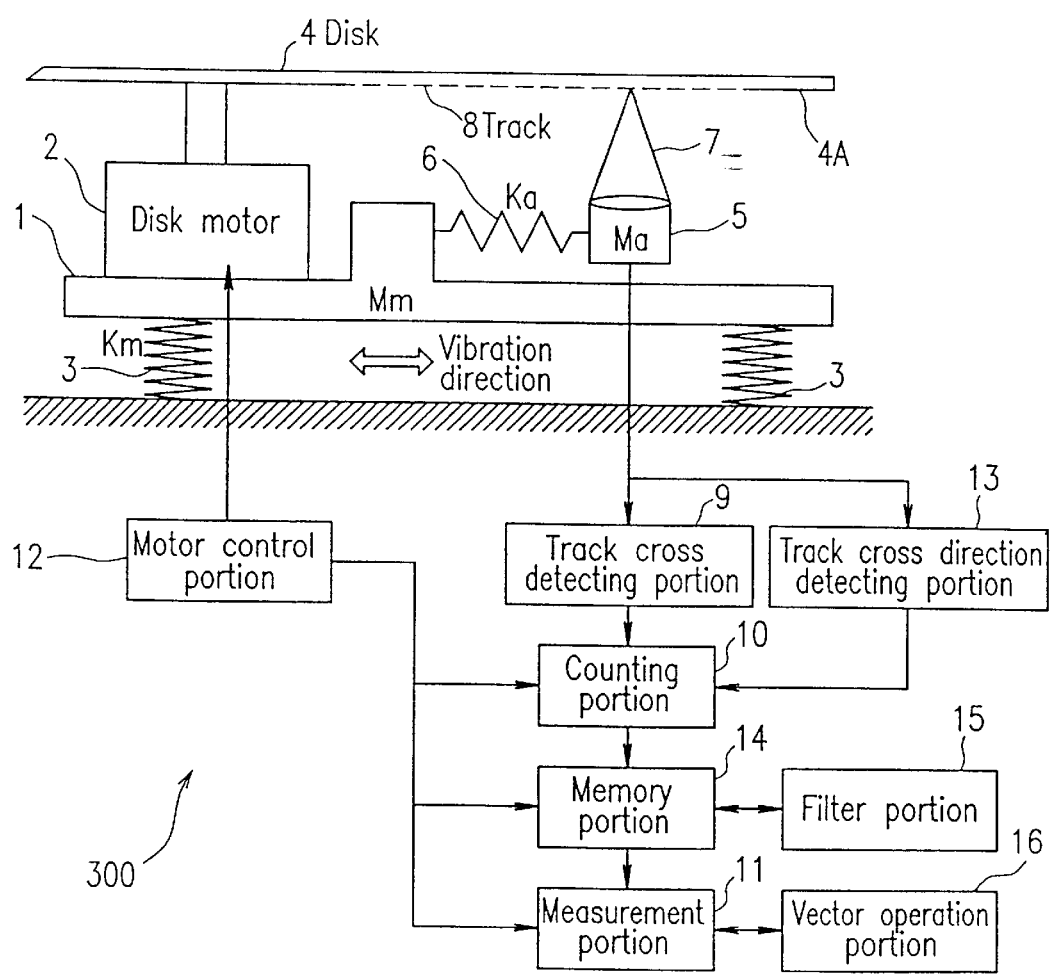
FIG. 3 is a block diagram showing a vibration detecting device of Embodiment 3 according to the present invention.

FIG. 3 is a block diagram of an optical disk reproducing apparatus 300 of Embodiment 3 according to the present invention. The same components as those in the optical disk reproducing apparatus 200 of Embodiment 2 in FIG. 2B are denoted with the same reference numerals as those therein. The detailed description thereof will be omitted.

The optical disk reproducing apparatus 300 of Embodiment 3 is different from the optical disk reproducing apparatus 200 of Embodiment 2, in that the optical disk reproducing apparatus 300 includes a vector operation portion 16 connected to the measurement portion 11.

Up to the point where the count result N1(θ[i]) and the count result N2(θ[i]) (i=1, 2 . . . k) are memorized in the memory portion 14, and the subtraction result M(θ[i]) is obtained, the same steps as those of Embodiment 2 are conducted. However, in Embodiment 3, the optical disk is divided by 6 (k=6) to perform a track count.

Figure 4A:
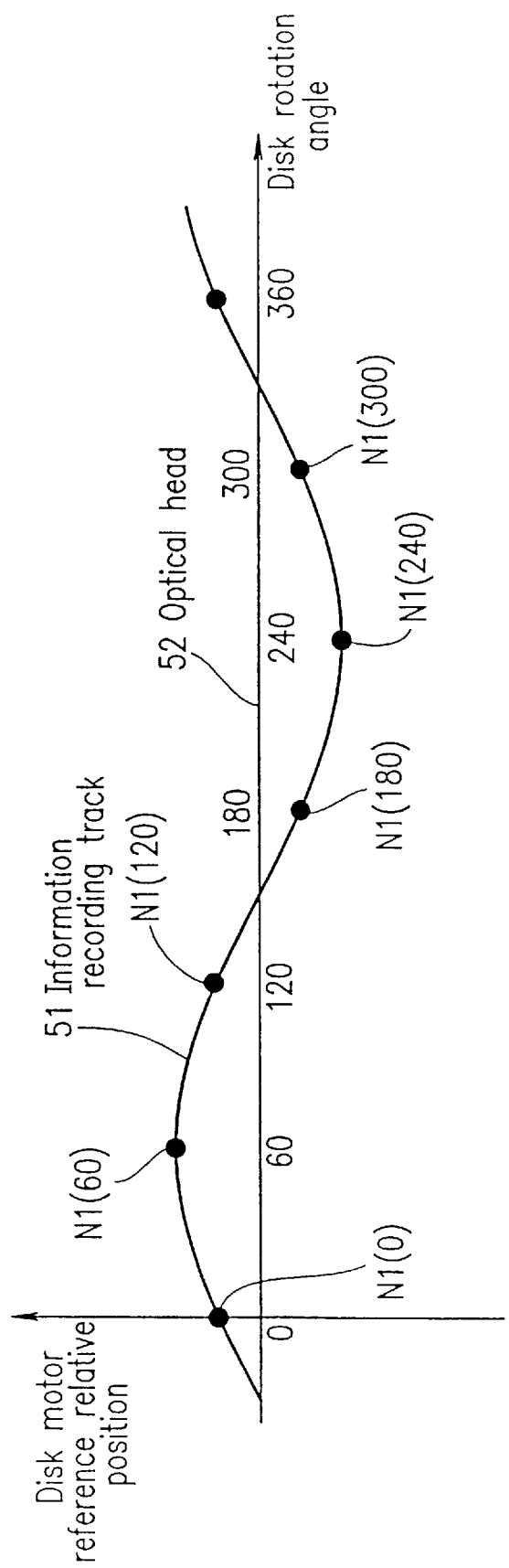
FIG. 4A is a diagram showing a signal waveform at a first velocity of Embodiment 3 according to the present invention.
Figure 4B:
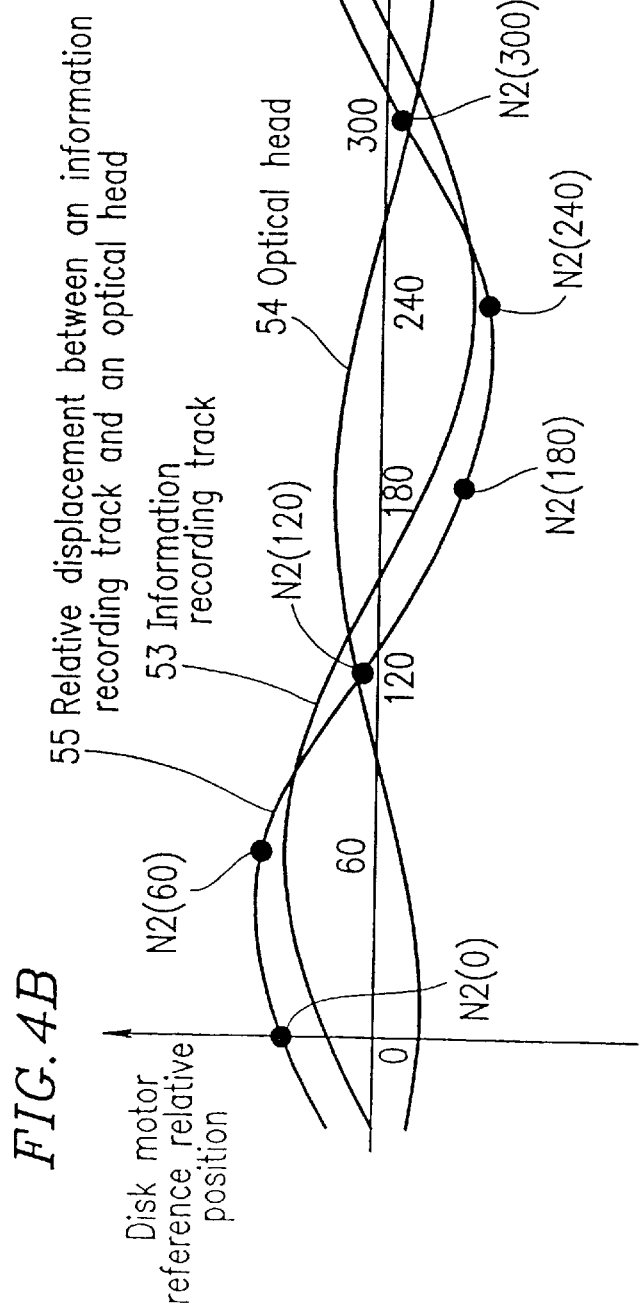
FIG. 4B is a diagram showing a signal waveform at a second velocity of Embodiment 3 according to the present invention.

FIGS. 4A and 4B are graphs showing relationships among the rotational angle of an optical disk, the amount of eccentricity of the optical disk 4, and the displacement of the optical head 5.

FIG. 4A shows the measurement results in the case where the optical disk 4 is rotated at a first velocity. Reference numeral 51 denotes an eccentricity waveform of the information recording track 8, and 52 denotes a displacement waveform of the optical head 5. Black circles shown in FIG. 4A on the eccentricity waveform of the information recording track 8 indicate a count result N1(θ[i]) (i=1, 2 . . . k) (θ[i]) (i=1, 2 . . . 6) obtained by counting a track cross pulse.

FIG. 4B shows the measurement results in the case where the optical disk 4 is rotated at a second velocity. Reference numeral 53 denotes an eccentricity waveform of the information recording track 8, 54 denotes a displacement waveform of the optical head 5, and 55 denotes a waveform representing the relative displacement between the information recording track 8 and the optical head 5. Black circles shown in FIG. 4B on the relative displacement waveform 55 between the information recording track 8 and the optical head 5 indicate a count result N2 (θ[i]) (i=1, 2 . . . 6) obtained by counting a track cross pulse.

The displacement waveform 54 of the optical head 5 represents vibrations of the optical head 5 due to the mass eccentricity of the optical disk 4. It is understood from the waveform 55 representing the relative displacement between the information recording track 8 and the optical head 5 that even when the velocity of the optical disk 4 is changed, the amplitude and phase of eccentricity of the optical disk 4 will not be changed; therefore, the eccentricity waveform 53 of the information recording track 8 is equal to the eccentricity waveform 51 of the information recording track 8.

As shown in FIGS. 4A and 4B, the count result N1 (θ[i]) on the eccentricity waveform 51 of the information recording track 8 and the count N2(θ[i]) on the waveform 55 representing the relative displacement between the information recording track 8 and the optical head 5 both become sine waves under the condition that the disk rotational angle (θ[i]) is a variable. Thus, the subtraction result M(θ[i]) obtained by subtracting the count result N1(θ[i]) on the eccentricity waveform 51 from the count result N2(θ[i]) on the relative displacement waveform 55 also becomes a sine wave. The amplitude of vibrations of the base 1 can be obtained from the maximum value of the subtraction result M(θ[i]).

Figure 5A:
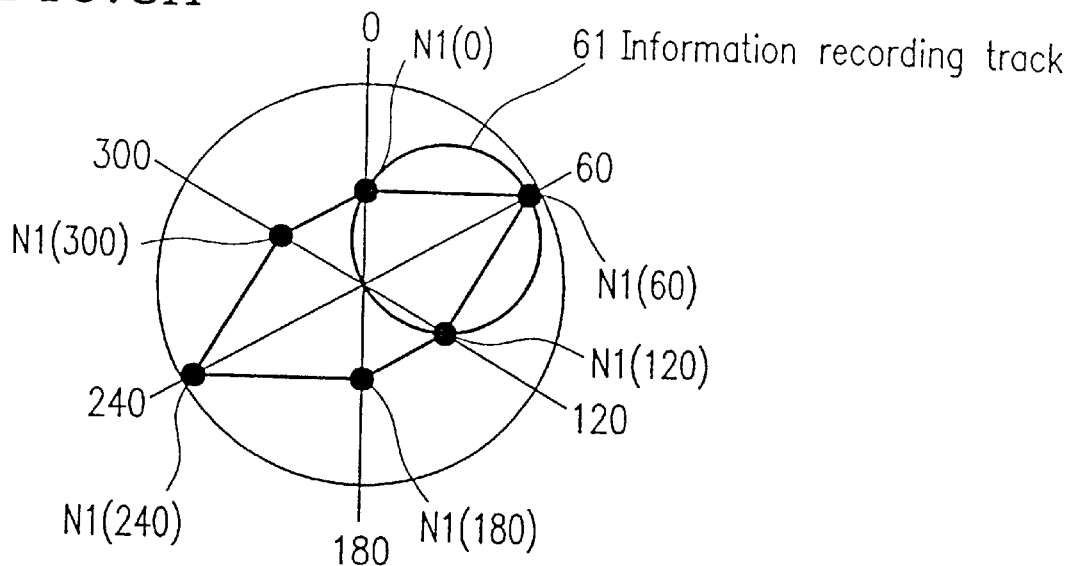
FIG. 5A is a distribution diagram of measurement data of a count result N1(θ[i]) of Embodiment 3 according to the present invention.
Figure 5B:
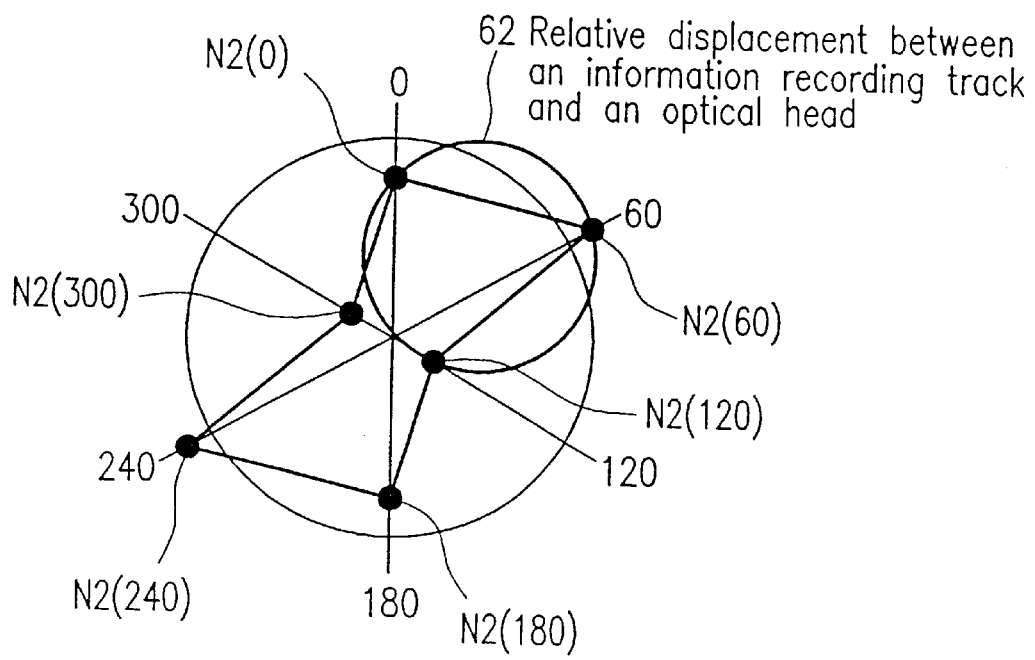
FIG. 5B is a distribution diagram of measurement data of a count result N2(0[i]) of Embodiment 3 according to the present invention.
Figure 6:
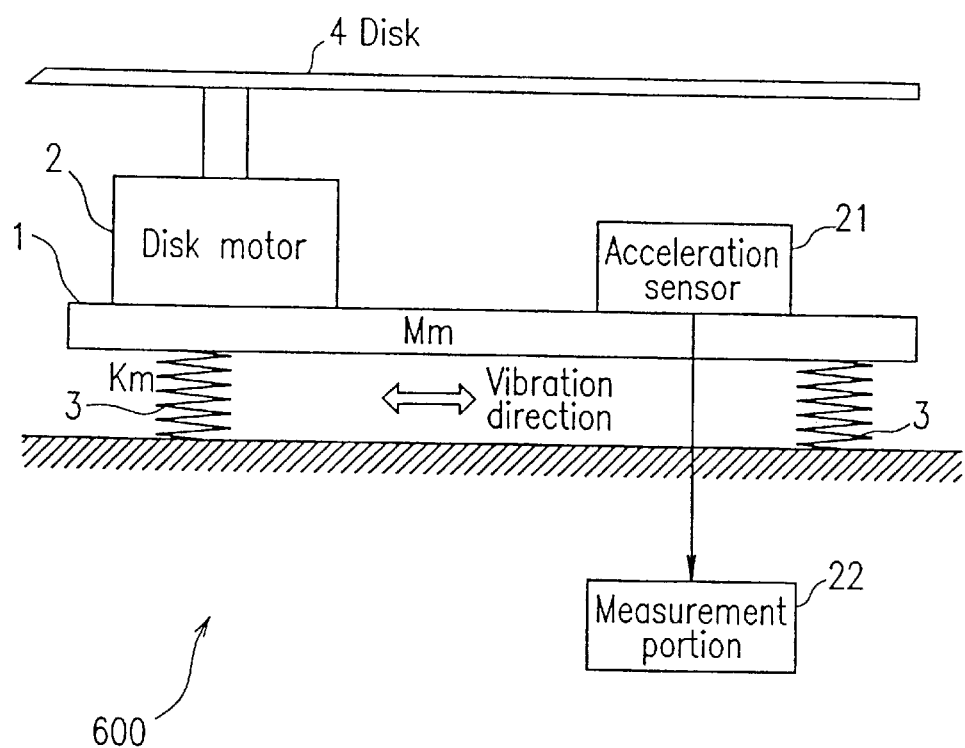
FIG. 6 is a block diagram showing a conventional vibration detecting device.

Referring to FIGS. 5A to 5C, when the count result N1(θ[i]) on the eccentricity waveform 51, the count result N2(θ[i]) on the relative displacement waveform 55, and the subtraction result M(θ[i]) are represented by vectors having sizes N1(θ[i]), N2(θ[i]), and M(θ[i]), and a phase angle of θ[i], each position of vectors representing the count result N1(θ[i]), the count result N2(θ[i]), and the subtraction result M(θ[i]) correspond to a vertex of an equilateral triangle inscribed in a circle passing through an origin.

Referring to FIG. 5A, when the count result N1(θ[i]) on the eccentricity waveform 51 is represented by a vector having a size N1(θ[i]) and a phase angle of θ[i], each position of a vector representing the count result N1(θ[i]) corresponds to a vertex of an equilateral triangle inscribed in a circle passing through an origin. FIG. 5A shows an example in which each position of vectors representing the count results N1(0), N1(60), and N1(120) corresponds to a vertex of an equilateral triangle inscribed in a circle 61 passing through an origin.

Referring to FIG. 5B, when the count result N2(θ[i]) on the relative displacement waveforms 55 is represented by a vector having a size N2(θ[i]) and a phase angle of θ[i], each position of a vector representing the count result N2(θ[i]) corresponds to a vertex of an equilateral triangle inscribed in a circle passing through an origin. FIG. 5B shows an example in which each position of vectors representing the count results N2(0), N2(60), and N2(120) corresponds to a vertex of an equilateral triangle inscribed in a circle 62 passing through an origin.

Referring to FIG. 5C, when the subtraction result M(θ[i]) is represented by a vector having a size M(θ[i]) and a phase angle of θ[i], each position of a vector representing the subtraction result M(θ[i]) corresponds to a vertex of an equilateral triangle inscribed in a circle passing through an origin. FIG. 5C shows an example in which each position of vectors representing the subtraction results M(300), M(0), and M(60) corresponds to a vertex of an equilateral triangle inscribed in a circle 63 passing through an origin.

An absolute value of a differential vector (M(i), i)−(M(i+1), i+1), (i=0, 60, 120, 180, 240, 300) between adjacent vectors is equal to the length of one side of the above-mentioned equilateral triangle. Therefore, an average value of absolute values of these 6 differential vectors ((M(0),0)−(M(60),60), (M(60),(60)−(M(120),120), (M(120),120)−(M(180),180), (M(180),180)−(M(240),240), (M(240),240)−(M(300),300) and (M(300),300)−(M(0),0)) is obtained, whereby a measurement error contained in an actual subtraction result M(θ[i]) can be minimized.

Furthermore, the length of one side of the above-mentioned equilateral triangle is proportional to the amplitude of the subtraction result M(θ[i]) which varies in a sine wave, so that the amplitude of vibrations of the base 1 can be measured.

In the above-mentioned Embodiments 1 through 3, the first velocity generates a frequency lower than the intrinsic frequency foA, and the second velocity generates a frequency higher than the intrinsic frequency foA and lower than the intrinsic frequency foM. However, the present invention is not limited thereto. Even in the case where the first velocity is higher than the intrinsic frequency foA, the same results and effects as those of Embodiments 1 through 3 can be obtained. This is because a centrifugal force due to the mass eccentricity of the optical disk 4 increases in proportion with the square of the velocity of the optical disk 4. Even in the case where the second velocity generates a frequency lower than the intrinsic frequency foA, the same results and effects as those of Embodiments 1 through 3 can be obtained. When the velocity generates a frequency equal to or lower than the intrinsic frequency foA, the relative displacement amount between the optical disk 4 and the optical head 5 decreases in proportion with the square of the velocity of the optical disk 4.

In Embodiments 1 through 3, the amplitude of vibrations is measured by using two kinds of velocities (i.e., first velocity and second velocity). However, the present invention is not limited thereto. A plurality of velocities including the third, fourth, . . . velocities which are higher than the second velocity may be used. In this case the amplitude of vibrations is measured while switching a lower velocity to a higher velocity. When large vibrations are generated at a low velocity due to the mass eccentricity of the optical disk 4, measurement of the amplitude of vibrations is completed at this point. When the mass eccentricity of the optical disk 4 is small, the amplitude of vibrations is measured at a velocity higher than the second velocity, whereby vibrations are minimized, compared with the case of the second velocity, and measurement of vibrations can be performed with higher precision.

As described above, according to the present invention, an optical disk reproducing apparatus having a vibration detecting device capable of measuring an amplitude of vibrations without using an acceleration sensor and a signal amplifier at a low cost and minimal use of space.

Furthermore, according to the present invention, even in the case where the direction of eccentricity of an optical disk is different from that of mass eccentricity thereof, an optical disk reproducing apparatus having a vibration detecting device capable of measuring an amplitude of vibrations without using an acceleration sensor and a signal amplifier at a low cost and minimal use of space.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk reproducing apparatus including a body, a disk motor which rotates a disk in which information recording tracks are formed concentrically or spirally on an information recording surface, a base fixed onto the disk motor and elastically suspended with respect to the body, and an optical head which is suspended with an elastic member from the base and is displaceable in a radial direction of the disk, comprising:

a track cross detecting portion for generating a track cross pulse, based on a reproduction signal when a light beam emitted from the optical head crosses the information recording tracks;

a track cross direction detecting portion for detecting a track cross direction representing a direction in which the light beam emitted from the optical head crosses the information recording tracks;

a motor control portion for controlling a velocity of the disk motor and outputting rotational angle information of the disk motor;

a counting portion for counting the track cross pulse generated by the track cross detecting portion, based on the track cross direction detected by the track cross direction detecting portion and the rotational angle information output from the motor control portion; and a measurement portion for measuring an amplitude of vibrations of the base, based on a count result of the counting portion.

2. An optical disk reproducing apparatus according to claim 1, wherein the motor control portion rotates the disk motor at a first velocity and a second velocity which is higher than the first velocity, the track cross pulse includes a first track cross pulse generated at the first velocity and a second track cross pulse generated at the second velocity, the count result includes a first count result at the first velocity and a second count result at the second velocity, the counting portion counts the first track cross pulse at the first velocity and the second track cross pulse at the second velocity, and the measurement portion computes a difference between the first count result at the first velocity and the second count result at the second velocity.

3. An optical disk reproducing apparatus according to claim 1, wherein the rotational angle information includes an absolute position of a rotational angle of the disk, the absolute position includes a rotational angle θ[i] (i is a natural number, 0°≦θ[i]≦360°) obtained by dividing the disk by a plurality of angular segments, and the counting portion counts the track cross pulse from a rotational angle θ[i−1] to a rotational angle θ[i] (i is a natural number, $0° \leq \theta[i-1] < \theta[i] \leq 360°$) to obtain a count result N(θ[i]).

4. An optical disk reproducing apparatus according to claim 3, wherein the counting portion discards the count result N(θ[i]) in a case where a difference in an absolute value between the count result N(θ[i]) and a count result M(θ[i]+180) between which a rotational angle of the disk is apart by 180°.

5. An optical disk reproducing apparatus according to claim 3, wherein the motor control portion rotates the disk motor at a first velocity and a second velocity which is higher than the first velocity, the track cross pulse includes a first track cross pulse generated at the first velocity and a second track cross pulse generated at the second velocity, the count result N(θ[i]) includes a first count result N1(θ[i]) at the first velocity and a second count result N2(θ[i]) at the second velocity, the counting portion counts the first track cross pulse at the first velocity and the second track cross pulse at the second velocity, and the measurement portion computes a difference M(θ[i]) between the first count result N1(θ[i]) of the counting portion at the first velocity and the second count result N2(θ[i]) of the counting portion at the second velocity, and obtains a maximum value of the difference M(θ[i]) to measure an amplitude of vibrations of the base.

6. An optical disk reproducing apparatus according to claim 1, wherein the rotational angle information includes an absolute position of a rotational angle of the disk, the absolute position includes a rotational angle θ[i] (1 is a natural number, $0° \leq \theta[i] \leq 360°$) obtained by dividing the disk by angular segments at 60°, and the counting portion counts the track cross pulse for each rotational angle 60° to obtain a count result N(θ[i]).

7. An optical disk reproducing apparatus according to claim 6, wherein the motor control portion rotates the disk motor at a first velocity and a second velocity which is higher than the first velocity, the count result includes a first count result at the first velocity and a second count result at the second velocity, the measurement portion represents a subtraction result between the first count result at the first velocity and the second count result at the second velocity as a vector having a corresponding disk rotational angle as a phase angle and the subtraction result with a sign as an absolute value, and the measurement portion computes six differential vectors between the vectors adjacent to each other, and computes an average of an absolute value of the six differential vectors to measure an amplitude of vibrations of the base.

8. An optical disk reproducing apparatus according to claim 1, wherein the counting portion averages the count result of a plurality of rotations of the disk.

9. An optical disk reproducing apparatus according to claim 2, wherein the motor control portion rotates the disk motor at a third velocity which is higher than the second velocity, the track cross pulse further includes a third track cross pulse generated at the third velocity, the count result further includes a third count result at the third velocity, the counting portion further counts the third track cross pulse at the third velocity, and the measurement portion further computes a difference between the third count result at the third velocity and the first count result at the first velocity.

* * * * *